United States Patent [19]

Hansen

[11] 4,203,494
[45] May 20, 1980

[54] TOOL AND DISK MOUNTING ASSEMBLY

[76] Inventor: Elmer K. Hansen, 801 S. Martha, Sioux City, Iowa 51102

[21] Appl. No.: 968,374

[22] Filed: Dec. 11, 1978

[51] Int. Cl.² .................... A01B 35/18; A01B 61/04
[52] U.S. Cl. ................................. 172/166; 172/710; 172/702
[58] Field of Search ............ 172/710, 142, 166, 572, 172/573, 705, 702, 254

[56] References Cited

U.S. PATENT DOCUMENTS

| | | | |
|---|---|---|---|
| 2,493,811 | 1/1950 | Graham | 172/710 |
| 2,632,372 | 3/1953 | Williams | 172/142 X |
| 2,869,657 | 1/1959 | Harrop | 172/710 |
| 2,906,353 | 9/1959 | Rogers | 172/166 X |
| 3,658,362 | 4/1972 | Fackler | 172/166 |
| 3,700,039 | 10/1972 | Essex | 172/705 |
| 3,912,019 | 10/1975 | Baughman | 172/142 |

*Primary Examiner*—Richard J. Johnson

*Attorney, Agent, or Firm*—Rudolph L. Lowell; G. Brian Pingel

[57] ABSTRACT

A reversible mounting assembly for pivotally mounting a ground tool and a coulter disk from the tool bar of a soil tilling implement. The mounting assembly has a base plate that is reversibly attachable against the under surface of the tool bar in either of two positions, elongated frame members fixed to and extended longitudinally of the base plate such that in one base plate position, projected portions of the frame members are located to the front of the tool bar and in the other base plate position are located to the rear of the tool bar. A tool support member is pivotally connectible to the projected portions of the frame members and includes a first socket portion at one end to receive a shank member of the tool and a second socket portion at an opposite end to receive a shank section of the coulter disk. A yieldable pressure assembly acts on the tool support member to normally maintain the tool and the disk in operative positions therefor.

4 Claims, 10 Drawing Figures

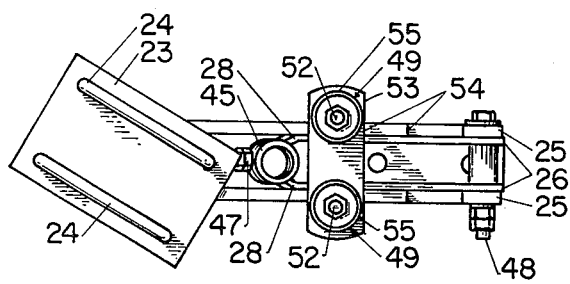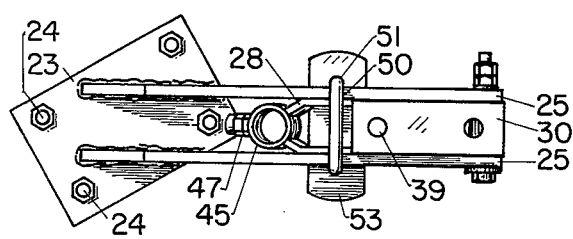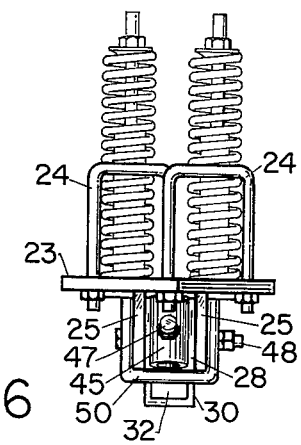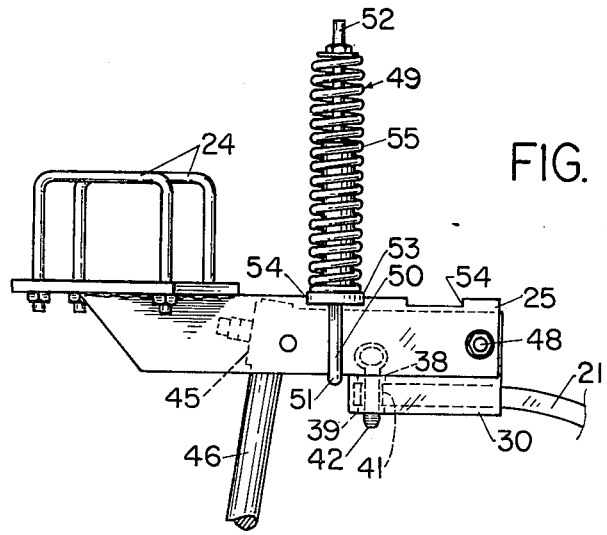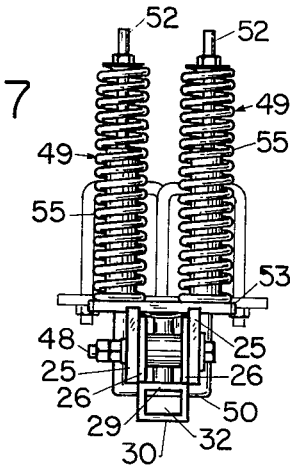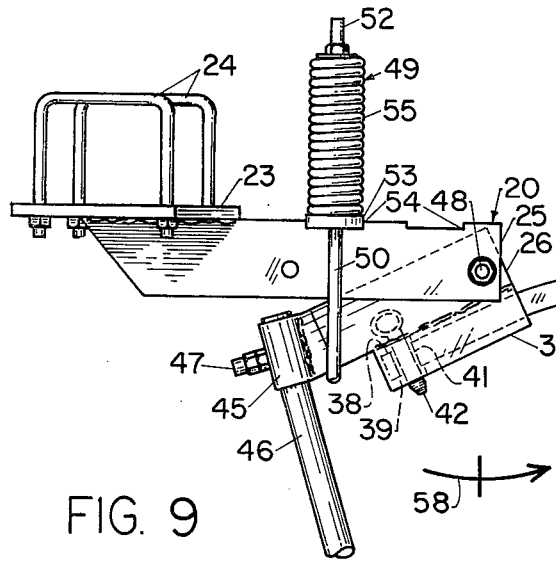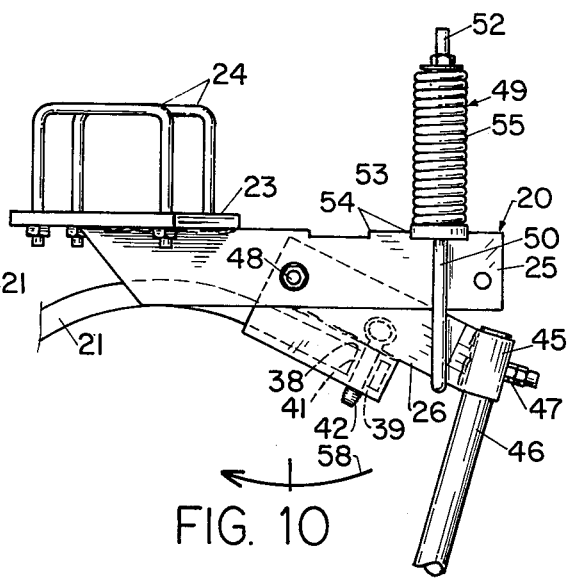

TOOL AND DISK MOUNTING ASSEMBLY

BACKGROUND OF THE INVENTION

1. Field of the Invention

The present invention relates in general to assemblies for mounting or coupling the shank of a ground tool to the tool bar of a soil tilling farm implement, and more specifically relates to such assemblies that release the ground tool for pivotal movement out of an operating position upon encountering an obstruction in the soil.

2. Description of the Prior Art

Assemblies for movably supporting ground tools on a tool bar of a soil tilling farm implement are well known in the art to avoid damage to the ground tools when encountering large obstacles in the soil being tilled. When a tool supported by such an assembly encounters an obstruction in the soil, the obstruction force applied on the tool pivots it from a normal operating position to pass over the obstruction. Typical such assemblies are disclosed in U.S. Pat. Nos. 2,493,811 and 3,700,039.

None of the above known assemblies are adapted for the reversible mounting of the tool from the tool bar in order to permit the tools to be extended to the front or rear of the tool bar depending upon the desired spacing between adjacent tools. An assembly is disclosed in my U.S. patent application Ser. No. 838,744, filed Oct. 3, 1977, that provides for a reversible mounting of tools from a tool bar, but the tools are held in a fixed position and are not pivotally movable in response to striking an obstruction.

The present invention differs from prior art assemblies by not only providing a mounting assembly that has both the features of movably and reversibly supporting a tool on a tool bar, but also is adapted to serve as a means for supporting a coulter disk in a fixed relation to the tool.

SUMMARY OF THE INVENTION

The present invention provides an assembly for pivotally mounting or supporting a tool and a coulter disk on a soil tilling implement tool bar in a position either forwardly or rearwardly of the bar. The work tool and coulter disk have shanks releasably securable in a tool support means that serves to pivotally connect the tool and disk to an elongate frame means. The frame means is in turn fixed to a base plate mountable on the tool bar either in a first position in which the frame means extends forwardly of the tool bar or in a second position with the frame means extended rearwardly of the tool bar.

A yieldable pressure means is employed to act on the tool support means to maintain the tool and disk in operative positions therefor. However, when the work tool encounters a large obstacle in the soil during a tilling operation, an obstruction force is exerted on the tool which counteracts the spring pressure and causes the tool to pivot rearwardly out of engagement with the obstacle.

The tool support means is disposed parallel to the direction of travel of the farm implement and includes a first socket portion at one end for releasably securing the tool shank, and a second socket portion at an opposite end for releasably securing the shank of the coulter disk. The tool support means is pivotally attached to the frame means and is reversible with respect thereto to maintain the work tool positioned rearwardly of the coulter disk in both positions of the frame means.

DESCRIPTION OF THE DRAWINGS

FIG. 4 is a reduced plan view of the mounting assemblies of FIG. 3;

FIG. 5 is a reduced bottom view of the mounting assembly of FIG. 3;

FIG. 6 is a reduced view in elevation of one end of the mounting assembly of FIG. 3;

FIG. 7 is a reduced view in elevation of the opposite end of the mounting assembly of FIG. 3;

FIG. 8 is a reduced side view in elevation of the mounting assembly of FIG. 3 shown in assembly relation with the shank portions of a work tool and a coulter disk;

FIG. 9 is a side view similar to that of FIG. 8 but showing a tool support member of the mounting assembly pivoted from a normal operating position therefor; and FIG. 10 is a side view similar to that of FIG. 8 but showing the support member reversed relative to its position in FIG. 8 and pivoted from a normal operating position therefor.

DETAILED DESCRIPTION OF THE PREFERRED EMBODIMENTS

Figure 1:
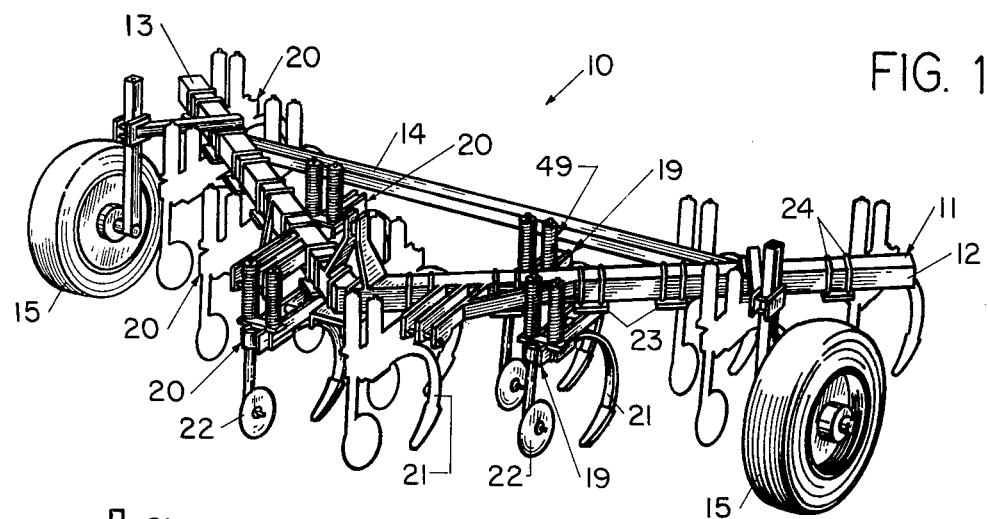
FIG. 1 is a perspective view of a soil tilling implement having a tool bar shown in assembly relation with a plurality of reversible mounting assemblies of the present invention for supporting work tools and coulter disks to the tool bar.
Figure 2:
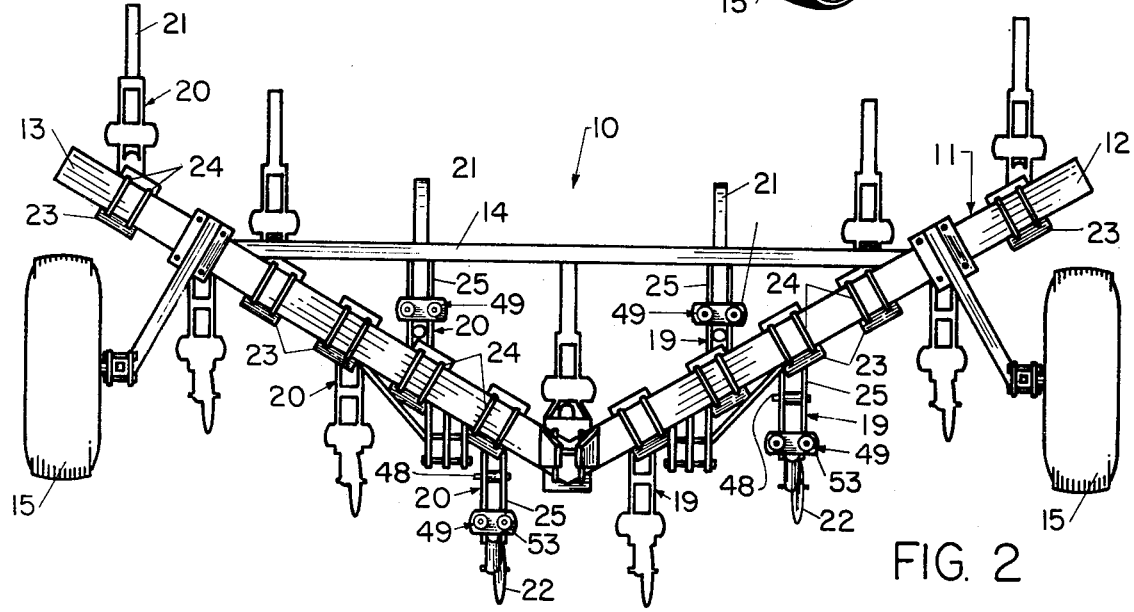
FIG. 2 is a plan view of the soil tilling implement of FIG. 1.

Two preferred embodiments of the present invention will now be described with reference to the drawings, wherein FIGS. 1 and 2 show a cultivator 10 having a tool bar 11 of V-shape in plan view. The tool bar is of a two piece construction that includes elongated right and left legs 12 and 13 respectively. A brace member 14 is connected to the free ends of the legs 12 and 13 for purposes of strength and rigidity. The tool bar 11 is supported off the ground by running gear 15, and may be attached at the apex thereof to the three point hitch of a usual farm tractor.

A plurality of mounting assemblies 19 and 20, representing preferred embodiments of the present invention, are rigidly attached on the tool bar legs 12 and 13, respectively, for supporting work tools 21 and coulter disks 22 for a cultivating operation. However, it should be understood that the mounting assemblies 19 and 20 are not limited to employment on the cultivator 10, but may instead be employed on a wide variety of ground tilling implements requiring securement of various types of tools and coulter disks to a tool bar.

The individual elements of the assemblies 19 are identical to their respective counterparts forming the assemblies 20. Accordingly, the assemblies 19 and 20 differ from one another only in the manner in which the elements of each thereof are assembled. Because such differences of assembly are relative only to whether the assemblies are for use on the leg 12 or the leg 13, the basic construction of the present invention will be described only with reference to the assemblies 20.

Figure 3:
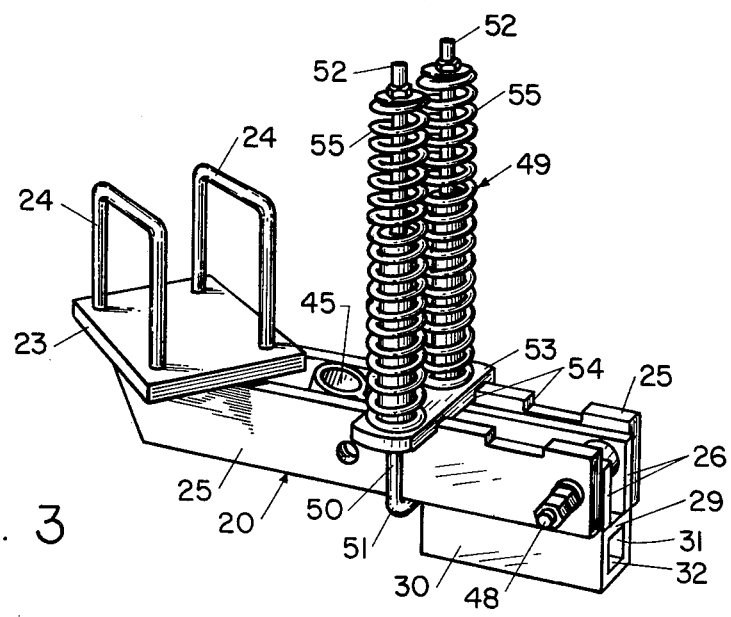
FIG. 3 is an enlarged perspective view showing a first preferred embodiment of one of the mounting assemblies of FIG. 1.

Referring now to FIG. 3, each of the mounting assemblies 20 has a base plate 23 adapted to be attached to the underside of the tool bar leg 13 preferably by a pair of U-bolts 24 that serve as rigid attachment means interconnecting the base plate 23 and the leg 13. The base plate 23 is shown as being of a rectangular shape, but such shape may be varied. A pair of generally rectangular shaped longitudinally extended, frame arms 25 are secured along their upper edges to the lower surface of the base plate 23 and project outwardly at an angle thereto such that their longitudinal axes are parallel to the advance movement of the cultivator 10 during a tilling operation. It is preferable to employ two arms 25 to insure a strong supporting structure but in certain instances, the use of a single arm 25 may be sufficient.

An elongated tool support member 26 is pivotally disposed between the outer ends of the projected portions of the arms 25 and includes a pair of spaced apart bracket members 28 (FIGS. 5, 9 and 10). A first socket means 30 is welded to the outer bottom edges of the frame arms 25 and has a rectangular shape in transverse cross section and a longitudinal axis parallel to the arms 25.

A bore 31 of the socket means 30 is of a size to receive the upper portion of a shank member 37 (FIGS. 8-10) of one of the tools 21 through an end opening 32 thereof. A set of aligned apertures 38 and 39 are formed respectively in the bar 29 and the floor of the channel portion 27 near one end thereof. The shank member 37 of each of the tools 21 has a linear upper end portion formed with an aperture 41, and a tool 21, received through the end opening 32 into the socket means 30, is secured thereto by inserting a connecting pin 42 or other such retention means through the aligned apertures 38, 39 and 41. Such insertion of the pin 42 can be readily accomplished because the arms 25 serve as a frame means for positioning the tool support member 26 in a location remote from the tool bar 11.

The tool support member 26 has a second tubular socket means 45 that is fixed, as by welding, to the inner ends of the bracket members 28 (FIGS. 4 and 5). The longitudinal axis of the second socket means 45 is in a generally orthogonal relation to the longitudinal axes of the arms 25, and the socket means 45 is cylindrically shaped for receiving the upper part of a rod shaped shank section 46 of one of the coulter disks 22. A bolt 47 is threaded through the side wall of the socket means 45 for frictionally securing the shank section 46 therein.

As indicated in FIG. 8, the tool support member bracket members 28 are pivotally attached to the outer end portions of the arms 25 by a pivot connection 48 so that an attached tool shank member 37 is disposed near the outer ends of the arms 25 and the coulter disk shank 46 is disposed medially of the arms 25. However, as indicated in FIG. 10, the tool support member 26 can be reversed in position so that the bracket members 28 are pivoted to the arms 25 approximately medially thereof to reverse the positions of the tool 21 and disk 22. The purpose of such reversal of parts is to provide for a reversible mounting of the assemblies 20 on the tool bar leg 13 such that the arms 25 project either forwardly or rearwardly thereof. As a result, the assemblies 20 can be selectively arranged as indicated by FIGS. 1 and 2, wherein adjacent assemblies 20 are disposed with their arms 25 oppositely directed. Such arrangement provides for a wider spacing between the tools 21 of adjacent assemblies 20 to insure that clods or lumps of soil will not be wedged therebetween.

To normally hold the tool support member 26 from pivoting about the connection 48, a spring assembly 49 provides a yieldable connection between the arms 25 and the member 26. The spring assembly 49 includes a U-bracket 50 that has a curved end 51 disposed about the arms 25 and the tool support member 26, and an open end defined by legs 52 extended above the arms 25 (FIGS. 6-8). Also, an abutment plate 53 is slidably mounted on the U-bracket legs 52 to fit into notches 54 in the top of the arms 25 and a coil spring 55 is positioned on each leg 52 between the abutment plate 53 and a spring cap 56 threaded on the upper end of a leg 52.

Upon the tool 21 encountering a large obstacle in the soil which exerts a force on the tool sufficient to overcome the compression force of the springs 55, the tool support member 26 will be rotated rearwardly in the direction of arrow 58 in FIG. 9 to pivot the tool 21 out of its operative position and permit the obstacle to pass thereunder, thus avoiding damage to the tool. Once the obstacle is passed by, the compressed springs 55 will then return the tool support member 26 to its normal position, thereby also placing the tool 21 in its normal soil tilling operation position.

Thus, the present invention not only provides a single means for securely fastening both a coulter disk and a work tool on a tool bar, but also provides for pivotal movement of the tool to avoid serious damage thereto as a result of encountering large obstacles in the soil being tilled.

Although the invention has been described with respect to preferred embodiments thereof, it is to be understood that it is not to be so limited since changes and modifications can be made therein which are within the full intended scope of this invention as defined by the appended claims.

I claim:

1. A reversible mounting assembly for releasably securing a work tool and a coulter to a tool bar of a soil tilling farm implement for pivotal movement of the tool and coulter from normal soil engaging positions to inoperative positions upon encountering an obstruction during a tilling operation, wherein said work tool has a shank member and said coulter a shank section, said mounting assembly comprising:
   (a) a base plate with upper and lower surfaces,
   (b) elongated frame means fixed to and extended longitudinally of the lower surface of said base plate and having an end portion projected outwardly from one end of said base plate,
   (c) means for attachment of said base plate against the under surface of said tool bar such that in one position the projected end portion of said frame means is located to the front of the tool bar and in a reversed position is located to the rear of the tool bar, with the longitudinal axis of the frame means in each of said positions of the base plate being directed parallel to the direction of travel of said farm implement;
   (d) tool support means pivotally connectible to the projected end portion of said frame means and having:
      (1) a first socket means disposed at one end of said tool support means to receive said shank member of said tool, and
      (2) a second socket means disposed at an opposite end of said tool support means to receive said shank section of said coulter, and (e) yieldable pressure means that coacts with said frame means and said tool support means to normally hold said tool and said coulter in operative positions therefor.

2. A reversible mounting assembly as recited in claim 1 wherein:
   (a) the longitudinal axis of said first socket means is parallel to that of said frame means, and
   (b) the longitudinal axis of said second socket means is substantially orthogonal to that of said frame means.

3. A reversible mounting assembly as recited in claim 1 wherein:
   (a) said frame means is comprised of a pair of transversely spaced longitudinally extended arms, and
   (b) said tool support means is disposed between the projected end portions of said arms remote from said tool bar and is pivoted at one end to said end portions.

4. A reversible mounting assembly as recited in claim 1 wherein said yieldable pressure means include:
   (a) connecting means disposed about said frame means and said tool support means, and
   (b) spring means that coacts with said connecting means to yieldably hold said socket means and said frame means with their longitudinal axes normally in a parallel relation.

* * * * *